United States Patent [19]
Gillen

[11] 3,801,090
[45] Apr. 2, 1974

[54] COORDINATE TABLE

[76] Inventor: William P. Gillen, 175 4th Ave., Chula Vista, Calif. 92010

[22] Filed: July 10, 1972

[21] Appl. No.: 269,994

[52] U.S. Cl.................... 269/60, 269/310, 408/91
[51] Int. Cl............................................. B23q 3/18
[58] Field of Search .......... 269/55, 58, 60, 61, 310; 108/20, 137, 138, 143; 408/91

[56] References Cited
UNITED STATES PATENTS

| | | | |
|---|---|---|---|
| 3,124,018 | 3/1964 | Gough | 269/60 |
| 562,788 | 6/1896 | Anderson | 269/60 |
| 227,252 | 5/1880 | Hodges | 269/310 X |
| 468,328 | 2/1892 | Cadell | 408/91 |
| 3,325,162 | 6/1967 | Lukas | 269/60 |

Primary Examiner—Donald G. Kelly
Assistant Examiner—Mark S. Bicks
Attorney, Agent, or Firm—Brown & Martin

[57] ABSTRACT

A table providing a work surface is mounted on a supporting base for movement to selected coordinate positions along two orthogonal axes. The drive mechanism for the table is fixed in a central position on the base and actuates screw means attached to the table. The entire drive mechanism is enclosed within the table and actuating motors are mounted in the base, the table being supported by orthogonal bars sliding in guide blocks which roll on top of the base for smooth and precise operation.

8 Claims, 5 Drawing Figures

COORDINATE TABLE

BACKGROUND OF THE INVENTION

Coordinate positioning devices are widely used for holding work pieces, marking locations and similar operations. The usual mechanism includes a block or holder slidably mounted on parallel bars, that assembly being slidable on other bars for motion in two axes. Drive means is coupled to the movable block or to carriers on the guide bars, the drive often being external of the bar structure and in many instances, being connected to both sides of the moving assembly to ensure parallel alignment. Such apparatus is large and complex for driving a rather small block to selected coordinate positions.

SUMMARY OF THE INVENTION

The coordinate table described herein has a compact mechanism which is substantially reversed from the usual arrangement. A large work table encloses the drive mechanism, which is fixed at a central position on a supporting base. The entire table rolls on the base and moves around the drive means along two orthogonal axes. Smooth precise support is provided by guide bars fixed to the table and sliding in trunnion blocks which are roller mounted and driven directly from the central drive means. Individual motors enclosed in the base actuate the drive mechanism to drive the table on the two axes to the required coordinate positions. All mechanism is fully enclosed and the complete unit requires an area only slightly larger than the area covered by the table at its limits of travel.

The primary object of this invention, therefore, is to provide a new and improved coordinate table.

Another object of this invention is to provide a new and improved coordinate table having a large work table surface which is moved orthogonally about a compact central drive mechanism.

A further object of this invention is to provide a new and improved coordinate table in which the drive mechanism is fully enclosed and contained within the dimensional limits of the table.

Other objects and many other advantages of this invention will become more apparent upon a reading of the following detailed description and an examination of the drawings, wherein like reference numerals designate like parts throughout and in which.

DESCRIPTION OF THE PREFERRED EMBODIMENT

Figure 1:
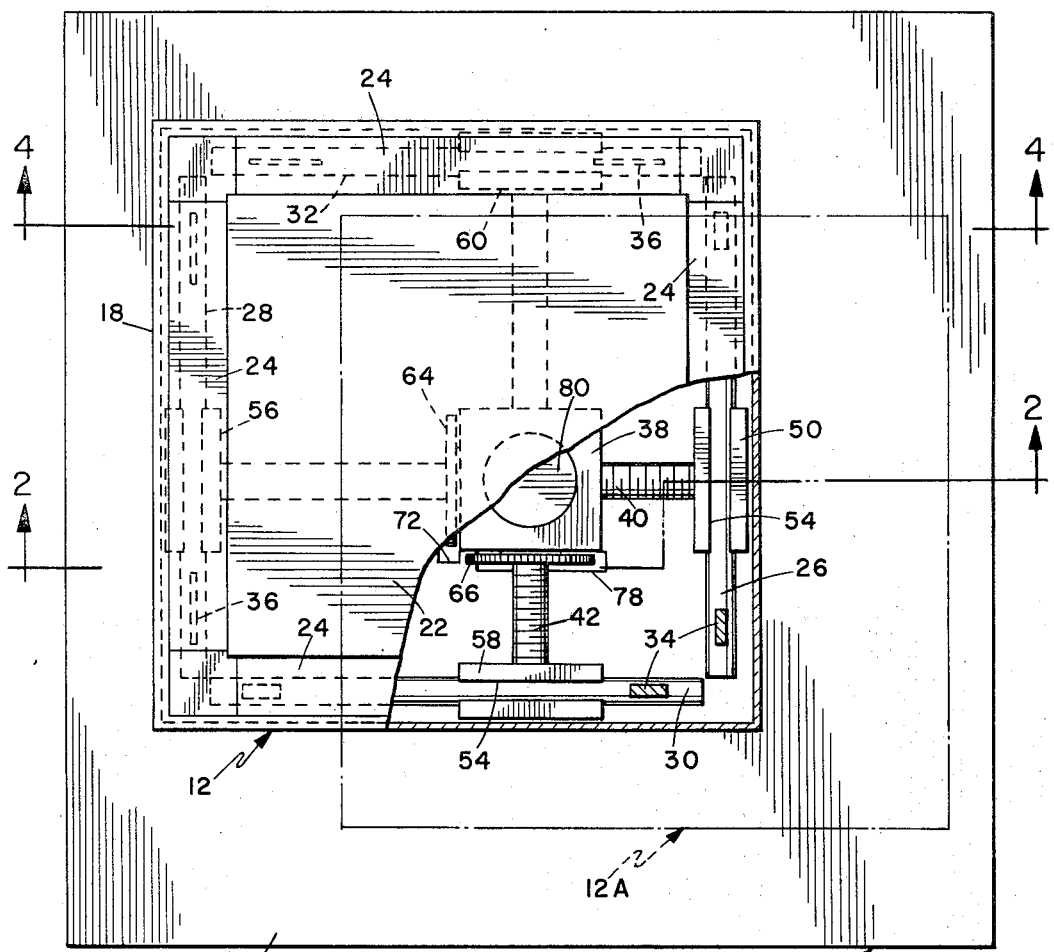
FIG. 1 is a top plan view of the complete unit, with a portion cut away.
Figure 2:
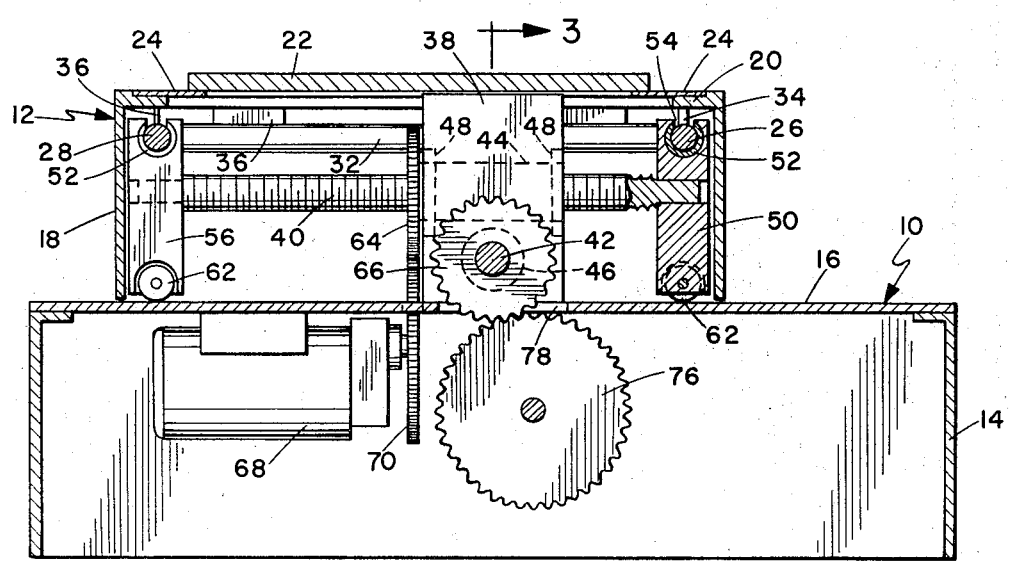
FIG. 2 is a sectional view taken on line 2—2 of FIG. 1.
Figure 3:
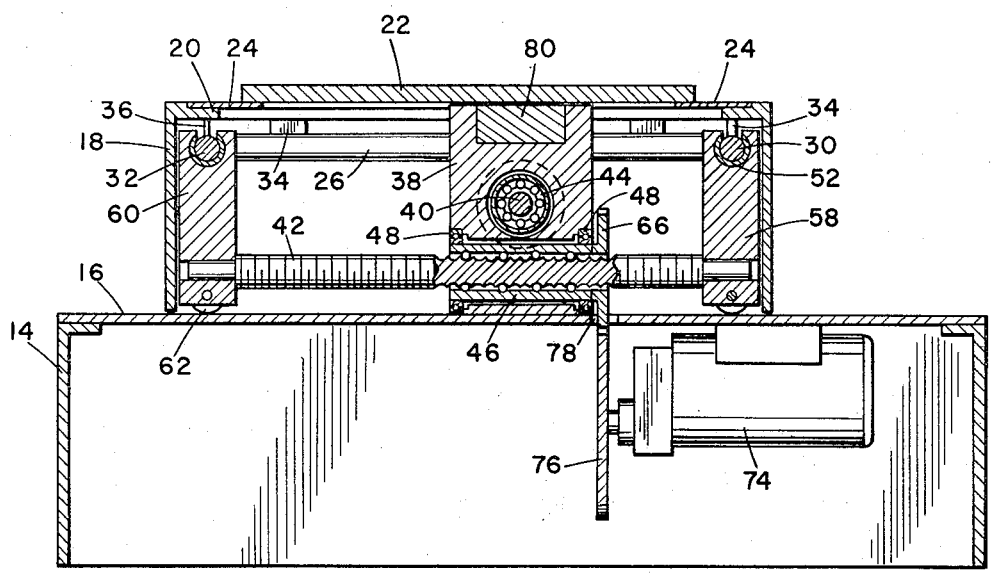
FIG. 3 is a sectional view taken on line 3—3 of FIG. 2.
Figure 4:
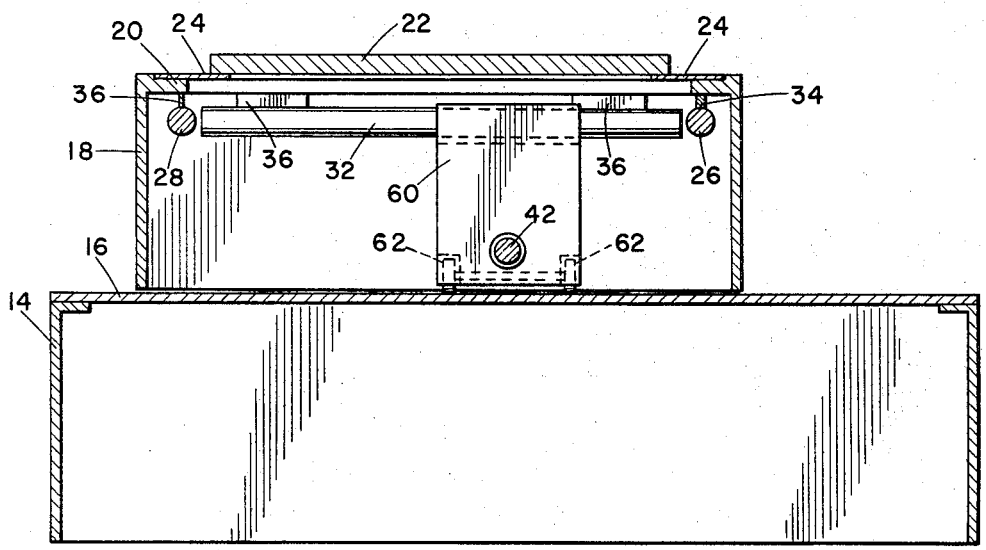
FIG. 4 is a sectional view taken on line 4—4 of FIG. 1.

The unit comprises a base 10 on which is mounted the movable table 12. Base 10 is a simple box 14 having a flat top platform 16, and may be of any suitable configuration.

Table 12 is illustrated as a square box structure having a peripheral wall 18 with an inwardly turned top flange 20. A flat rigid platen 22 is mounted on top of the table by thin resilient web plates 24 secured to and extending inwardly from flange 20, the platen being capable of very limited vertical movement.

At two opposite sides of table 12 are parallel guide bars 26 and 28, fixed to and spaced below flange 20. At the other two opposite sides are parallel guide bars 30 and 32, similarly fixed to flange 20 and orthogonal to bars 26 and 28. The guide bars 26 and 30 are secured by rigid posts 34 and act as the primary orthogonal guides. Bars 28 and 32 are supported by posts 36 having limited resiliency to allow the bars to maintain parallel alignment with their related rigid bars without frictional binding in their guides.

Fixed on the central portion of platform 16 is an upright drive block 38, the top of which is very close to the lower surface of platen 22, to provide support for the platen under load. Passing through the drive block are two orthogonal screw shafts 40 and 42, vertically spaced for clearance. For descriptive purposes, shaft 40 will be referred to as the X-axis shaft and shaft 42 as the Y-axis shaft. In the drive block 38 is a sleeve-like nut 44 encircling X-axis shaft 40, a similar nut 46 being fitted on Y-axis shaft 42. For smooth and precise action with minimum play, the nuts are illustrated as being of the recirculating ball type and are journalled in bearings 48, which hold the nuts against axial movement. The ball nut construction and operation is well known and is preferred for accuracy, but for some purposes conventional screw thread elements may be satisfactory.

Fixed to one end of X-axis shaft 40 is a trunnion block 50, in the top portion of which is a bushing 52, providing a channel to receive guide rod 26 with a smooth sliding fit. Bushing 52 is longitudinally slotted, as at 54, to provide clearance for posts 34 to pass through. A similar trunnion block 56 is fixed to the other end of shaft 40 to hold guide rod 28, the trunnion blocks 50 and 56 holding shaft 40 against rotation. Fixed to opposite ends of Y-axis shaft 42 are further similar trunnion blocks 58 and 60 to carry guide rods 30 and 32, respectively. Each of the four trunnion blocks is supported by rollers 62, to roll on platform 16 in the axial direction of the respective screw shafts.

Secured to one end of nut 44 is a pinion gear 64, and secured on one end of nut 46 is a similar pinion gear 66. Mounted below platform 16 is an X-axis drive motor 68, having a drive gear 70 which engages pinion gear 64 through a slot 72 in the platform. Also mounted below platform 16 is a Y-axis drive motor 74, having a drive gear 76 which engages pinion gear 66 through a slot 78 in the platform.

When drive motor 68 is operated, the gear drive rotates nut 44 and causes the non-rotating X-axis shaft 40 to move axially. Through trunnion blocks 50 and 56 the table 12 is thus moved in one direction across base 10. Operation of motor 74 rotates nut 46 and moves the Y-axis shaft 42 to shift the table 12 in another, orthogonal direction. In FIG. 1 the table is shown offset from a central position, upwardly and to the left. An alternative position is indicated in broken line at 12A.

Figure 5:
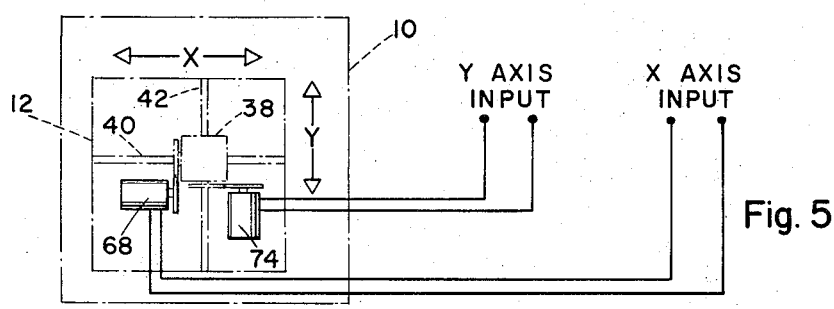
FIG. 5 is a diagram showing the action of the coordinate drive means.

The drive motors may be controlled by any suitable input signals, as in FIG. 5, to move the table to selected coordinate positions. In other types of coordinate positioning devices, timed signals have been used, also zero-seeking or nulling feedback circuits and stepped drives. The particular electrical circuitry will depend on the use of the mechanism.

A work piece attached to platen 22 can thus be positioned precisely with reference to a work station, such as in positioning a part to be drilled. Under drilling pressure, the web plates 24 allow platen 22 to be depressed slightly and rest on drive block 38, so avoiding undue load on the guide bars and screw drive mechanism. For some uses an electromagnet 80 may be inset in the top of drive block 38, and energized when necessary to clamp platen 22 securely in the selected position.

All of the drive mechanism is concentrated in a compact arrangement in a central position and is fully enclosed for protection. In a severe environment, the lower edge of wall 18 can be sealed to platform 16 by a flexible sliding skirt. Or a slight over pressure of air can be maintained inside the unit, to leak out under wall 18 and prevent ingress of foreign matter.

The table is movable through a considerable range of displacement on the base, the enclosed mechanism providing a work surface which is completely free of obstructions.

I claim:

1. A coordinate table comprising:

a base, a work supporting table mounted on said base, drive means fixed on said base and having orthogonally movable drive members connected to said table, for moving the table over relative to said base, said drive members being contained within the dimensional limits of the table, said drive means includes a drive block fixed to said base, and said drive members being screw threaded shafts passing through said block, each shaft having an actuating nut thereon, rotatably mounted in the block.

2. A coordinate table according to claim 1, and including actuating motors mounted in said base and connected to said actuating nuts for selective rotational drive of the nuts.

3. A coordinate table according to claim 1, and including trunnion blocks fixed to opposite ends of each of said shafts, said table being slidably mounted on said trunnions.

4. A coordinate table according to claim 3, wherein said table has orthogonally related pairs of guide rods fixed adjacent the periphery thereof, said trunnion blocks having channels in which said guide rods are slidably retained.

5. A coordinate table according to claim 4, wherein one guide rod of each pair is rigidly fixed to said table, the other guide rod of each pair having an attachment to the table with limited freedom of motion for maintaining parallelism with the rigid rod.

6. A coordinate table according to claim 4, wherein said base has a flat topped platform, each of said trunnion blocks having supporting rollers for rolling on said platform in the axial direction of the respective shaft.

7. A coordinate table according to claim 6, wherein said table has a work holding top platen thereon, said platen having resilient support means connected to the table for limited vertical displacement.

8. A coordinate table according to claim 7, wherein said drive block has an upper portion spaced immediately below said platen, for supporting the platen under downward load.

* * * * *